(12) United States Patent
Ekanem

(10) Patent No.: US 10,801,476 B2
(45) Date of Patent: Oct. 13, 2020

(54) ADVANCED GRAVITY-MOMENT-HYDRO POWER SYSTEM

(71) Applicant: NOSMEK GREEN SOLUTIONS, INC., West Des Moines, IA (US)

(72) Inventor: Nsisuk Osmund Ekanem, Etsako West (NG)

(73) Assignee: Nosmek Green Solutions, Inc., West Des Moines, IA (US)

( * ) Notice: Subject to any disclaimer, the term of this patent is extended or adjusted under 35 U.S.C. 154(b) by 0 days.

(21) Appl. No.: 16/727,168

(22) Filed: Dec. 26, 2019

(65) Prior Publication Data

US 2020/0208615 A1    Jul. 2, 2020

Related U.S. Application Data

(60) Provisional application No. 62/786,115, filed on Dec. 28, 2018.

(51) Int. Cl.
*F03G 3/00*    (2006.01)

(52) U.S. Cl.
CPC ..................... *F03G 3/00* (2013.01)

(58) Field of Classification Search
CPC ........ F03B 13/26; F03B 13/16; F03B 13/188; F03B 13/1885; F03B 13/20; F03B 15/00; F05B 2240/93; F05B 2260/4031; F05B 2220/706; F05B 2240/97; F05B 2280/5001; Y02E 10/38
See application file for complete search history.

(56) References Cited

U.S. PATENT DOCUMENTS 4,083,186 A * 4/1978 Jackson, Sr. .......... F03B 17/025
                                                    60/325
5,336,933 A    8/1994 Ernster
(Continued)

FOREIGN PATENT DOCUMENTS

DE    102010033340 A1    2/2012
DE    102012015421 A1    1/2014

OTHER PUBLICATIONS

International Searching Authority in connection with PCT/US2019/068553 filed Dec. 26, 2019, "The International Search Report and the Written Opinion of the International Searching Authority, or the Declaration", 13 pages, dated May 15, 2020.

*Primary Examiner* — Shafiq Mian
(74) *Attorney, Agent, or Firm* — McKee, Voorhees & Sease, PLC

(57) ABSTRACT

A power generating system based solely on gravity includes a housing with water in a main chamber. A convertible piston interacts with the water to move to displace the water in a cycle. The displaced water is directed into and through power generating units, with the outputted water from one power generating unit continued towards and through a subsequent power generating unit as the water moves back towards the main chamber of the housing. The water is then able to interact again with the convertible piston to again be displaced through the power generation cycle. At least two separate power generating systems are integrated for uninterrupted power supply for 24 hrs per day, 7 day per week and 365 days per year. This cycle continues (not in the concept of perpetual motion), as needed, to create energy that can be used on-demand or otherwise stored for future use.

19 Claims, 13 Drawing Sheets

(56) References Cited

U.S. PATENT DOCUMENTS

| | | | |
|---|---|---|---|
| 5,754,446 A | 5/1998 | Fisher, Jr. et al. | |
| 5,760,506 A | 6/1998 | Ahlstrom et al. | |
| 6,803,670 B2 * | 10/2004 | Peloquin | F03B 17/025 |
| | | | 290/42 |
| 8,024,927 B1 | 9/2011 | Azizi et al. | |
| 8,240,231 B2 | 8/2012 | Kwok | |
| 9,234,494 B2 * | 1/2016 | Anteau | F03B 17/005 |
| 9,847,696 B2 * | 12/2017 | Karousos | H02K 7/1807 |
| 2012/0169066 A1 | 7/2012 | Cheung | |
| 2012/0187687 A1 | 7/2012 | Walton et al. | |
| 2014/0312623 A1 * | 10/2014 | Anteau | F03G 7/04 |
| | | | 290/52 |
| 2015/0285207 A1 | 10/2015 | De Colombel | |
| 2017/0141649 A1 * | 5/2017 | Karousos | F03B 17/005 |

* cited by examiner

ADVANCED GRAVITY-MOMENT-HYDRO POWER SYSTEM

CROSS REFERENCE TO RELATED APPLICATIONS

This application claims priority under 35 U.S.C. § 119 to provisional patent application U.S. Ser. No. 62/786,115, filed Dec. 28, 2018. The provisional patent application is herein incorporated by reference in its entirety, including without limitation, the specification, claims, and abstract, as well as any figures, tables, appendices, or drawings thereof.

FIELD OF THE INVENTION

The invention relates generally to energy generation, energy conversion, energy storage and, in particular, electrical energy generation based on effective use of gravity, buoyant force, material science, principle of moments and lever.

BACKGROUND OF THE INVENTION

As the global population grows, and the advances of technology continue, the use of powered devices has grown as well. This comes with an exponential growth in power required from generation techniques, systems, and the like, and can be exacerbated in rural areas, where access to major power generation and distribution grid is less accessible. Furthermore, there are challenges associated with most power generation techniques and systems. Some examples follow:

Fossil Fuel Powered Plant: This includes all power plants that burns coal, natural gas, and petroleum and its derivatives to generate electricity. Fossil fuels are finite, non-renewable, and their combustion produces greenhouse gases such as carbon dioxide that studies have shown causes global warming leading to adverse climate change. Combustion of fossil fuels also produces other air pollutants, such as nitrogen oxides, sulfur dioxide, volatile organic compounds, and heavy metals. It also produces waste heat which further warms the earth's atmosphere adversely.

Nuclear Power Plant: This involves atomic nuclear fission, nuclear decay or nuclear fusion of mostly Uranium and Plutonium to generate heat which turns water into steam that drives turbines to generate electricity. It also generates substantial waste heat which warm the earth's atmosphere adversely and require large volume of scarce fresh water to cool the systems. Safety and issues of radiation hazards to life associated with the fuel and nuclear wastes has generated resentment to nuclear power. More so, nuclear proliferation into nuclear weapons is a global concern also limiting acceptance.

Solar Power: This uses photovoltaic cells (PV) to directly convert sunlight into electrical energy. Also, there is concentrated solar power (CSP) which uses lenses, mirrors, and tracking systems to focus a large area of sunlight into a small beam to heat water into steam to turn turbines for power. Photovoltaic cells are costly, depends on weather, require expensive storage system and above all require very large space per kilowatt.

Wind Power: This is the use of specially designed blades attached to a generator to capture wind energy and turns it into electricity. It is dependent on the weather (wind speed and duration), thus power generation is intermittent, requires expensive storage system(s), siting limitation and requires very large land area per kilowatt.

Geothermal Power: Geothermal energy is the original internal energy of the earth and stored energy due to radioactive decay of materials within the earth core. This involves the exploration and extraction of this heat energy from earth's core to heat water into steam for power generation or direct heating by drilling into the earth core and pumping the molten rock and water to the earth surface. However, this molten rock releases mixture of gases, notably carbon dioxide, hydrogen sulphide, methane and ammonia which causes acid rain and global warming leading to climate change. It is expensive and limited to locations near tectonic plates.

Tidal Power: This is power harnessed from ocean tides using specially designed turbines. It has location limitation as suitability is determined by tidal flow, tidal rise, ecosystem vulnerability and exposure to weather. Has very expensive upfront cost. It is generally harmful to aquatic life.

Hydro Power: This is power generated from flowing water due to gravity using special turbines. It requires expensive dams and can impact negatively on aquatic life and natural ecosystems. It is location limited as there must be sufficient geological gradient to create reasonable water head to drive the turbines. There must also be a body of flowing water such as a river. Pumped hydro power systems require external power source to pump water back to the storage reservoir to continue to generate power. This comes at a very high cost which narrows down profit margins and make it less attractive for investors given the huge initial capital expenditure.

Thus, there exists a crucial, timely, and dire need to combat climate change and aid in the deep decarbonization of Earth's atmosphere by providing a greener and cost efficient source of electricity generation with limited or no emission and smallest area footprint per kilowatt to meet both industrial and domestic electricity demand for 24-hrs per day, 7-days a week, and 365-days per year.

SUMMARY OF THE INVENTION

Therefore, it is a primary object, feature, and/or advantage of the any of the aspects of the invention disclosed to improve on or overcome the deficiencies in the art.

It is still yet a further object, feature, and/or advantage to provide an independent power generating system.

It is still yet a further object, feature, and/or advantage to provide continuous steady power, not intermittent—available at any time.

It is still yet a further object, feature, and/or advantage to provide power quality suitable for all kinds of loads and can withstand load surges.

It is still yet a further object, feature, and/or advantage to provide decentralized power generation, thereby ensuring less energy loss due to long distance transmission.

It is still yet a further object, feature, and/or advantage to provide flexible siting, lower capital cost, fast construction and commissioning, optimum water circulation, and early return on investment.

The previous objects, features, and/or advantages of the present invention, as well as the following aspects and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to some aspects of the disclosure, a power generating system includes a housing containing water with a penstock that controls water out of it to power generators; a convertible piston positioned in the housing, wherein the convertible piston is movable in the water contained in the water housing to displace an amount of the water; wherein the convertible piston is movable, in part, by gravity; note that the penstock must be opened partly or fully for power to be generated.

According to some aspects of the disclosure, a first power generation stage receive an amount of displaced water displaced by the convertible piston to create a first amount of electrical power; a second power generation stage in fluid communication with the first power generation stage, wherein the second power generation stage receives water outputted by the first power generation stage to create a second amount of electrical power; and a third power generation stage in fluid communication with the first and second power generation stages, wherein the third power generation stage receives water outputted by the first and second power generation stages to create a third amount of electrical power.

According to some additional aspects of the present disclosure, the first power generation stage comprises a Francis turbine.

According to at least some aspects of the disclosure, the second power generation stage comprises an array of Kaplan turbine pumps.

According to at least some aspects of the disclosure, the third power generation stage comprises at least one proprietary designed moment power wheel generator.

According to at least some aspects of the disclosure, the convertible piston comprises at least one ballast; a weighted portion; and an inflatable bladder.

According to at least some aspects of the disclosure, the at least one ballast of the convertible piston includes a selectively controllable valves to selectively allow water to enter or be pumped out of an interior of the ballast.

According to at least some aspects of the disclosure, the at least one ballast further comprises an air vent in communication with the atmosphere to add buoyancy to the convertible piston as the water in the ballast is pumped out.

According to at least some aspects of the disclosure, the inflatable bladder comes with an air compressor and compressed air tank unit which inflates it to control the downward movement of the convertible piston in the housing due to gravity. The inflatable bladder is deflated to control the upward movement of the convertible piston due to buoyancy.

According to at least some aspects of the disclosure, the system also includes a fourth power generation stage that receives water from the third power generation stage and before the water is re-introduced to the convertible piston and housing unit; wherein the fourth power generation stage comprises a vortex power generator.

According to at least some aspects of the disclosure, the system also includes a fifth power generation stage that receives water from the fourth power generation stage and before the water is re-introduced to the convertible piston and housing unit; wherein the fifth power generation stage comprises at least another Kaplan turbine generator.

According to at least some aspects of the disclosure, the system also includes a sixth power generation stage that receives water from the fifth power generation stage and before the water is re-introduced to the convertible piston and housing unit; wherein the sixth power generation stage comprises at least a second proprietary designed moment power wheel generator.

According to some aspects of the disclosure, a method of power generation includes moving a convertible piston in a vertical direction in a housing to displace water disposed in the housing, the convertible piston moving downward by gravity and upward by buoyancy; generating power at a first stage with the displaced water; outputting the water from the first stage to a second stage to generate additional power at the second stage; outputting the water from the second stage to a third stage to generate additional power at the third stage; and outputting the water from the third stage back towards the convertible piston in the housing.

According to at least some aspects of the disclosure, the method also includes, before outputting the water towards the convertible piston and housing unit, passing the water through a fourth, fifth, and sixth stage to generate additional power at each of the fourth, fifth, and sixth stages.

According to at least some aspects of the disclosure, the first stage comprises at least a Francis turbine generator; the second and fifth stages comprise Kaplan turbine generators; the third and sixth stages comprise moment power wheel generators; and the fourth stage comprises a vortex power generator.

According to at least some aspects of the disclosure, the step of moving the convertible piston downward by gravity comprises opening at least one entry to at least one ballast of the convertible piston to allow water to enter the at least one ballast to increase the weight of the convertible piston while expelling the air through the ballast vent to the atmosphere.

According to at least some aspects of the disclosure, the step of moving the convertible piston upward by buoyancy comprises pumping out the water in the at least one ballast and replacing the water with air naturally from the ballast vent to increase the buoyance of the convertible piston.

According to some aspects of the disclosure, gravity-based, moment hydro-power system includes a vertical housing containing water; a convertible piston in the housing, the convertible piston movable in a generally vertical direction; a power generation series in fluid communication with the housing, the power generation series comprising: a first stage power generator; a second stage power generator; and a third stage power generator; wherein each of the power generators of the power generation series in fluid communication with one another; and wherein the convertible piston moves downward, in part by gravity, to displace the water in the housing, the displaced water moving through the power generation cycle before returning towards the convertible piston.

According to at least some aspects of the disclosure, the power generation series further comprises: a fourth stage power generator; a fifth stage power generator; and a sixth stage power generator.

According to at least some aspects of the disclosure, the first stage comprises a Francis turbine generator; the second and fifth stages comprise Kaplan turbine generators; the third and sixth stages comprise moment power wheel generators; and the fourth stage comprises a vortex power generator.

According to at least some aspects of the disclosure, power is generated when the convertible piston moves downward, therefore to achieve independent and uninterrupted power generation (24 hrs for 7 days for 365 days per year), at least two separate units of housing and convertible piston must be built and synchronized such that when one convertible piston is up the other convertible piston is down. Thus, one convertible piston produces power to regenerate the other convertible piston.

According to at least some aspects of the disclosure, the convertible piston moves upward by buoyancy achieved by deflating the bladder and pumping water out of the ballast while air naturally fills the ballast via an air vent to the atmosphere and the simultaneous opening of the convertible steel convertible piston door for water to pass through as the convertible piston dives upward.

According to at least some aspects of the disclosure, the moment power wheel is specially designed to leverage on its large radius to amplify impact force at its fins to do much more useful work towards its center.

These and/or other objects, features, advantages, aspects, and/or embodiments will become apparent to those skilled in the art after reviewing the following brief and detailed descriptions of the drawings.

Figure 1:
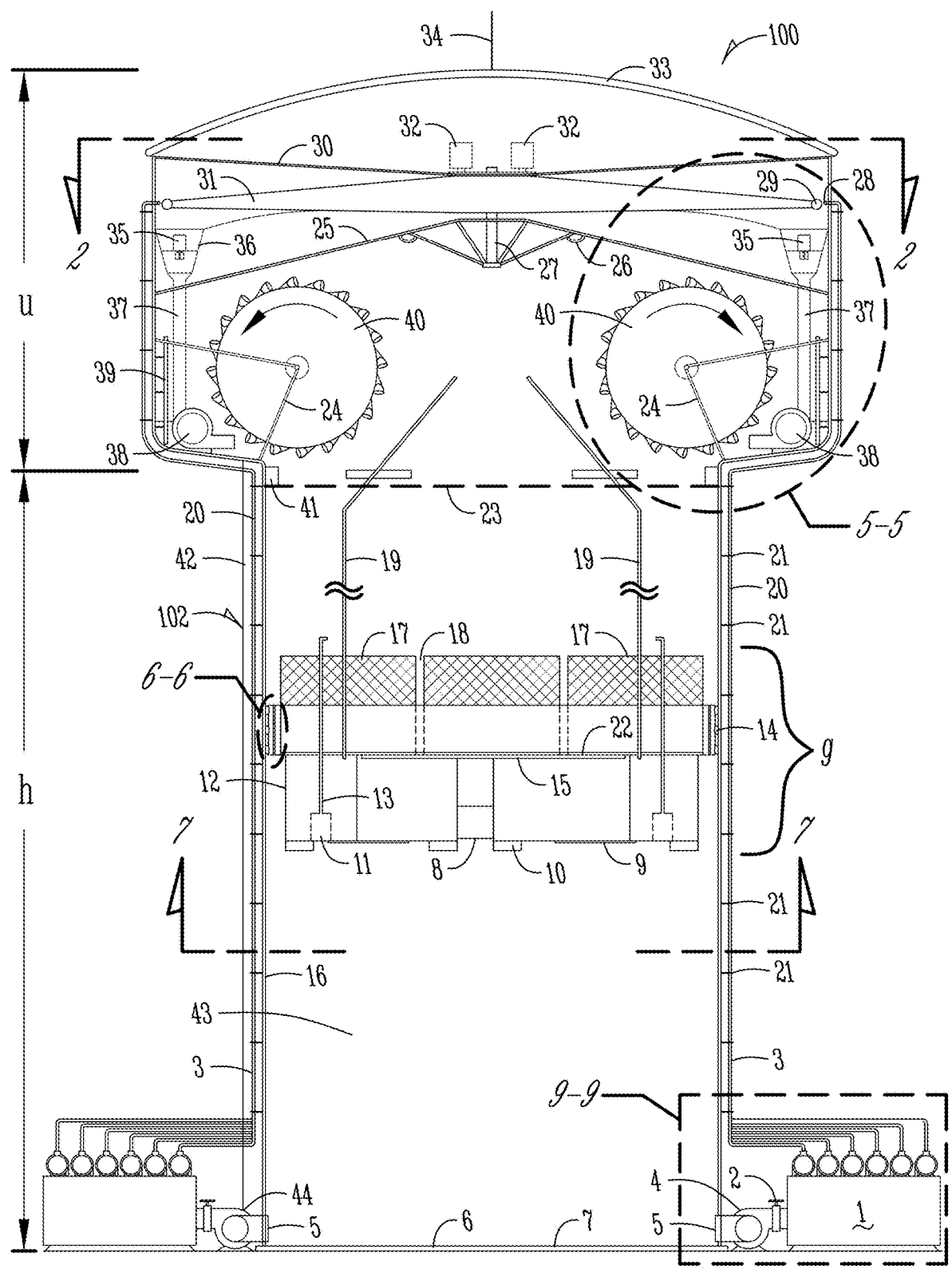
FIG. 1 is a sectional view of a power generating system according to aspects of the invention.
Figure 2:
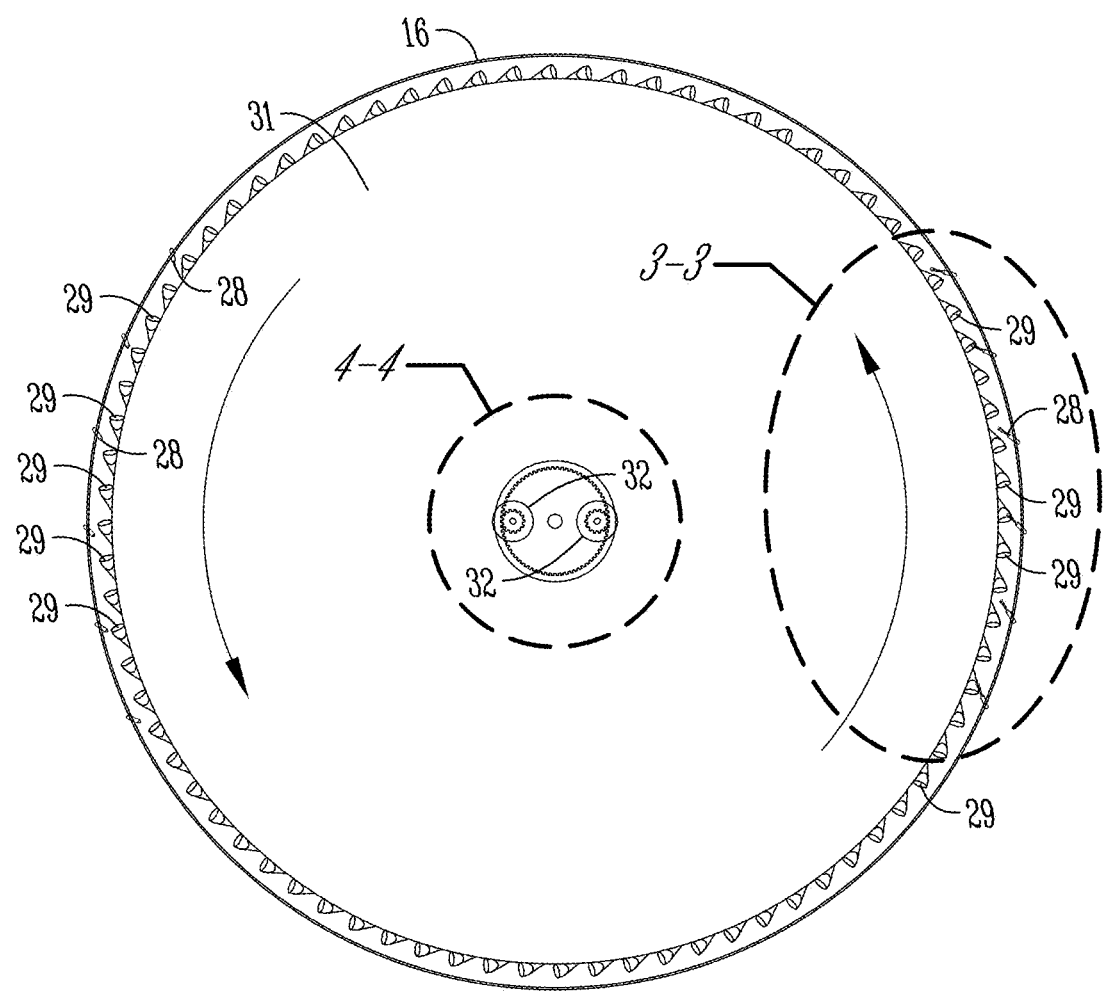
FIG. 2 is top, sectional view of a power generating system showing aspects of a moment power wheel positioned in the housing o the system taken along line 2-2 in FIG. 1.

Several embodiments in which the invention may be practiced are illustrated and described in detail, wherein like reference characters represent like components throughout the several views. The drawings are presented for exemplary purposes and may not be to scale, unless otherwise indicated, and thus proportions of features in the drawings shall not be construed as evidence of actual proportions.

DETAILED DESCRIPTION OF THE INVENTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in any part of the specification, including but not limited to the written description and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms characterizing a sequential order (e.g., first, second, etc.), a position (e.g., top, bottom, lateral, medial, forward, aft, etc.), and/or an orientation (e.g., width, length, depth, thickness, vertical, horizontal, etc.) are referenced according to the views presented. Unless context indicates otherwise, these terms are not limiting. The physical configuration of an object or combination of objects may change without departing from the scope of the present invention.

As will be understood, the following embodiments illustrate various aspects of a gravity based, moment hydroelectric power system 100, which may also be referred to generically throughout the following description as the power system 100. The power system 100 may include any of the individual components or assembly of components from any of the embodiments disclosed herein, any of the components or assemblies thereof may be combined in manners not specifically shown or described herein, but which may be obvious to those skilled in the art. In addition, as will be apparent, substitutions of like components, number of components, location of components, or other obvious variations to the power system 100 are also to be considered a part of the disclosure.

Therefore, as shown in FIGS. 1-9B, a power system 100 according to aspects of the disclosure is shown. As disclosed, the power system 100 may be considered a gravity-based, moment hydropower system. In particular, the system may be considered an advanced gravity moment hydropower system 100. The system 100 utilizes gravity to move components through a fluid, such as water, to create hydropower. As is known, hydropower is power derived from the energy of flowing water. However, as will be understood, the power system 100 disclosed herein does not rely on the naturally occurring movement of water, but instead will artificially create the water movement. In other words, what may be considered generally stagnant or otherwise substantially still water is acted upon to move the water through one or more energy-producing elements. The water is moved by a convertible piston that is allowed to move generally vertically due to gravity (which may be controlled or uncontrolled). The movement of the convertible piston relative to the water will cause displacement of the water through the power system 100 to create/generate electricity, which can then be sent for immediate use or stored for a later use. Thus, it is the movement of the convertible piston, at least partially caused by gravity that causes the artificial movement of the water to create the hydropower.

As shown in FIG. 1, the power system 100 includes a housing 102 with walls 16. The housing 102 and walls 16 may take generally any geometrical shape, and may be built above ground, below ground, or partially above and below ground. As shown in FIG. 1, the housing 102 includes a generally cylindrical base h, with a bulbous upper or distal portion u. A roof 33 is shown to be at the distal end of the bulbous portion u and can generally enclose the housing 100. Thus, the housing 102 may also be referred to as a tower, as the structure has a height and width that houses many of the components of the system 100. It should also be appreciated that the substantial length or height of the housing 16 from a base portion 6 to the distal roof 33 may be generally cylindrical with the same or similar diameter along the height of the housing 100. Other shapes and combinations of shapes may also be used to form the housing 100. The housing 102 will be filled with the water or other liquid, which is then moved to create the artificial movement to interact with the energy-producing components in order to create energy for use and/or storage. According to some embodiments, the housing 102 will have a minimum or suggested fill amount, which is shown by the dashed line 23 in FIG. 1. However, the location of this line may be dependent upon numerous factors, including, but not limited to, the height of the housing, the desired output of energy from the system, the width of the housing, the amount of travel of the components within the housing, the number of moving components within the housing, the flow rate of the artificially moved water, as well as other factors.

The floor of the housing 102 is a steel base 6 mounted on reinforced concrete deep piling base 7. The walls 16 of the housing 102 comprise a rigid composition. Exemplary compositions may be, but are not limited to, steel, concrete, fiberglass, plastics, stone, wood, composites, or some combination thereof. However, the materials disclosed herein are not to be limiting on the invention, and other materials are to be considered as part of the disclosure.

Initial water is introduced into the housing 102 using an external power source to power an external pump which draws water from underground aquifer or from a river source. Once a desired water level is reached, the specially designed convertible steel convertible piston g is operated also by an external power source which could be preferably wind or solar only at the initial stage.

A convertible piston assembly g is shown to reside within the housing 102, and in the particular configuration shown in FIG. 1, is shown to reside and move within the cylindrical base h portion of the housing 102. However, the convertible piston assembly g may be movable into the upper or bulbous section u as well. As will be understood, the movement of the convertible piston assembly g in the housing 102 creates the movement of the water stored within the housing 102.

The convertible piston assembly g is initially moved to a position within the housing 102 at an upward or distal location towards, to, or near the convertible piston stopper 41. At this location, the convertible piston assembly g may be fully or partially submerged within the water in the housing 102. In general, the convertible piston assembly g comprises a ballast tank level equalization line 8, a ballast tank bottom hose/hydraulic opener and closer 9, a convertible piston landing pad 10, a ballast tank submersible pump 11, a ballast tank 12, a ballast water discharge line fitted with check valve 13, an inflatable bladder seal 14, a convertible steel convertible piston door hydraulic closer/opener 15, closed steel tank or tanks containing a calculated mass of hematite 17, a convertible steel convertible piston water channel 18, a ballast tank air hose 19 vented to atmosphere, and a convertible steel convertible piston base 22.

As shown best in FIGS. 7A, 7B, 8A, and 8B, the convertible piston assembly g comprises a plurality of ballasts 12, which may be steel or other rigid materials. According to at least some embodiments, there may be four ballasts 12 per cylinder. However, this is not a required number, and any number of ballasts 1-N, where N is any number, is to be considered a part of the invention.

The artificial water movement within system 100 is imparted by the convertible piston g. A base 22 supports a plurality of closed or sealed tanks 17. According to at least some embodiments, the tanks 17 contain a weight bearing material, such as hematite or the like. The weight and amount of hematite or other material is calculated based on the volume of water 37 to be displaced within housing 102 and the amount of power to be generated. The convertible piston g has a central convertible piston door hydraulic closer and opener 15. This door 15 is closed when the convertible piston moves downward and open when the convertible piston moves upward. The convertible steel convertible piston water channel 18 allows smooth passage of water across the convertible steel convertible piston base 22. The closed steel tanks containing calculated mass of weighted material 17 provides the desirable base weight of the convertible steel convertible piston alongside with the steel frames and other steel structures on the convertible steel convertible piston. Further weight is derived from water above the convertible piston in the cylinder as it is being recycled back into the cylinder. The convertible steel convertible piston lands on the cylinder floor 6, 7 using the convertible steel convertible piston landing pad 10.

As noted, the convertible piston assembly g as shown in the figures includes four ballast tanks or chambers 12. Each chamber 12 includes a rotary plate 9 that allows water in, thus forcing air out towards the top of the enclosure, such as by way of a flexible air hose 19. Each chamber is connected by a level equalization pipe 8. The rotary plates 9 are actuated to open and close by way of a motor, which can be electrical, pneumatic, hydraulic, mechanical, or some combination thereof. Each chamber 12 includes a pump to push the water out when the convertible piston assembly g reaches the bottom or near the bottom of the cylindrical base h. The convertible piston assembly g has a larger rotary plate 50 at or near the center that opens and closes to allow the convertible piston to controllably rise and fall. This plate is also actuated to open and close by way of a motor, which can be electrical, pneumatic, hydraulic, mechanical, or some combination thereof. When each ballast chamber 12 rotary valves 9 are opened, the convertible piston rotary valve 15 is closed (see, e.g., FIG. 7B). The chambers 9 fill with water, which causes the convertible piston to lose its buoyancy and allows it to descend towards the bottom of the housing 102. When each ballast chamber rotary valve 9 is closed, the convertible piston rotary valve 15 is opened (see, e.g., FIG. 7A). The internal pumps of the ballast chambers force the water out and air flows in naturally, which causes the convertible piston to become buoyant and allows it to rise in the water toward the water surface (at or near the dashed line 23).

Figure 8A:
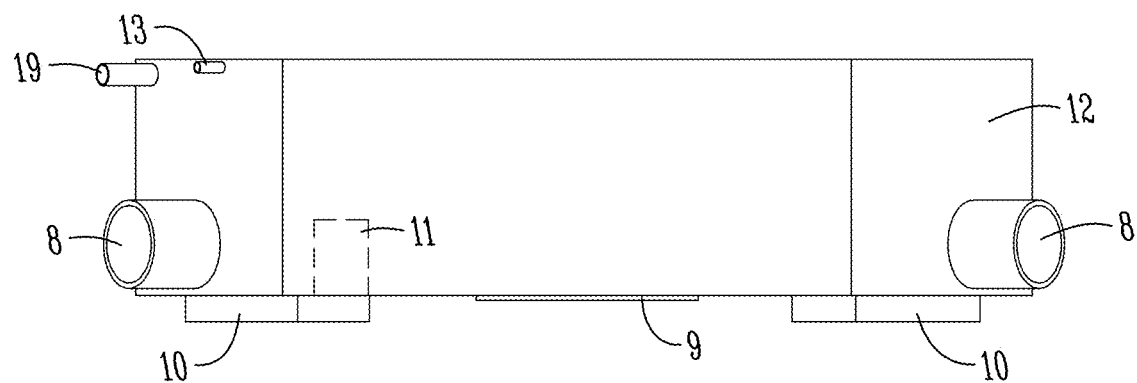
FIG. 8A is a plan view of a ballast.
Figure 8B:
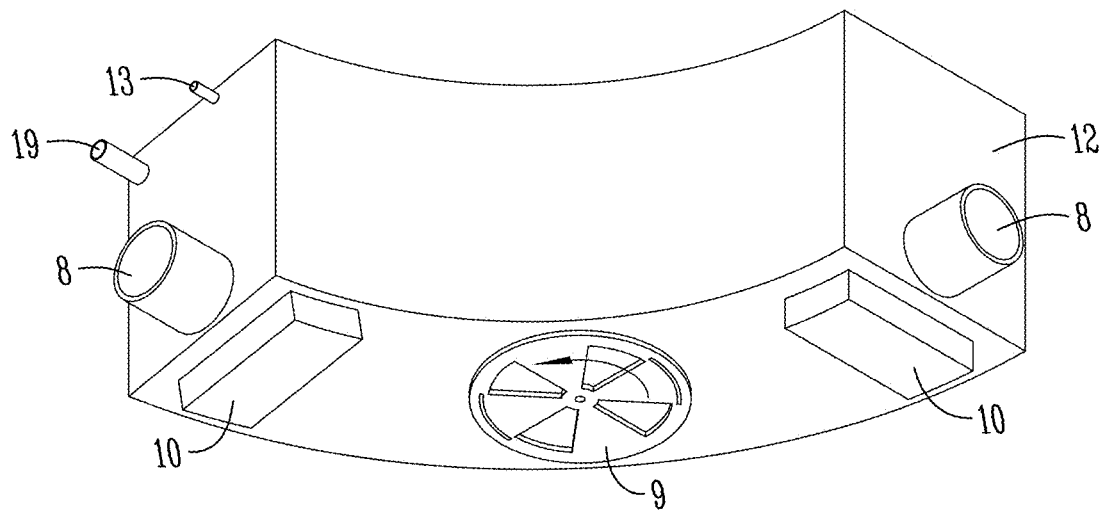
FIG. 8B is a perspective view of the ballast of FIG. 8A.

As shown best in FIGS. 8A and 8B, the ballast tank(s) 12 has an equalization line 8 to ensure that all ballast tanks 12 maintain substantially the same level. The ballast tank includes at least one opening mechanism 9, which has apertures to selectively allow water into the ballast tank.

According to some embodiments, the opening mechanism 9 may be a rotary actuator. However, other actuator, solenoid, geared, or similarly actuated doors or other selective opening members may be utilized such that the valves can be opened to allow an amount of water into the ballast, but closed to prevent or otherwise mitigate additional water from entering the ballast. Opening the ballast tank 12 allows water 43 to fill the ballast chamber. Air within ballast 12 is vented to atmosphere via a flexible air hose 19. The addition of the water to the ballast(s) of the convertible piston assembly will add weight and/or reduce the buoyancy of the convertible piston assembly. Thus, convertible piston g will dive or otherwise move downward when ballast 12 and door 15 are opened.

The convertible piston assembly g will return upwards towards to the water level 23 when water is discharged from the ballast tank(s) 12, such as via one or more submersible pumps 11 and discharge lines 13. The discharge line 13 incorporates a check valve to prevent pumped water from returning through the line 13. Air is pulled into the ballast tanks 12 through the hose 19 from atmosphere. The buoyancy of the convertible piston assembly g can overcome the weight of tanks 17 containing the weighted mass.

Figure 6A:
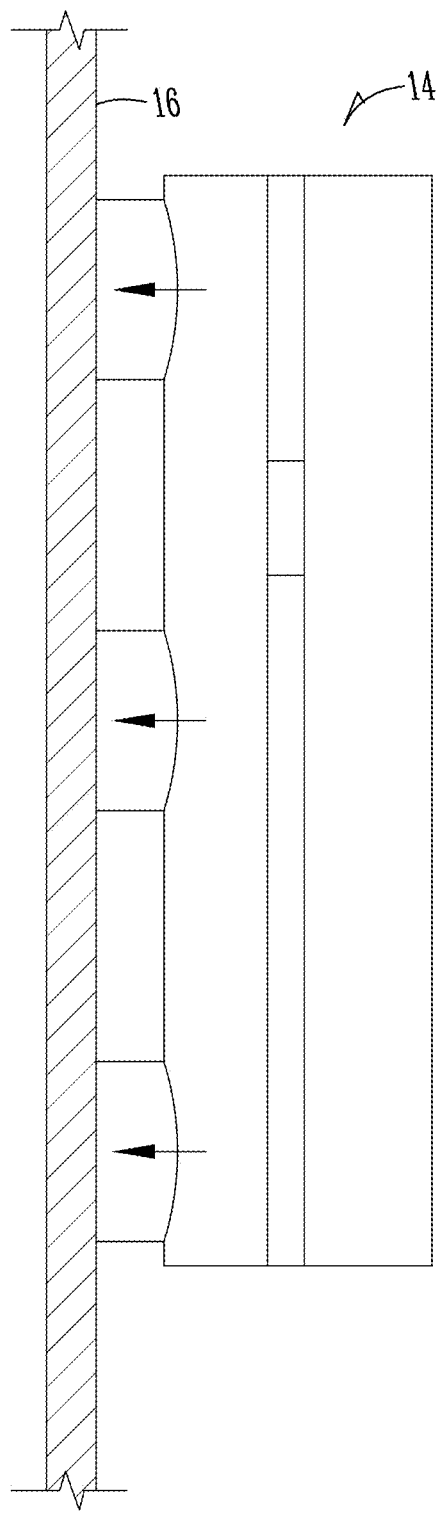
FIGS. 6A and 6B are enlarged views of a portion of the system of FIG. 1 showing bladders in an inflated configuration (FIG. 6A) and an uninflated configuration (FIG. 6B).
Figure 6B:
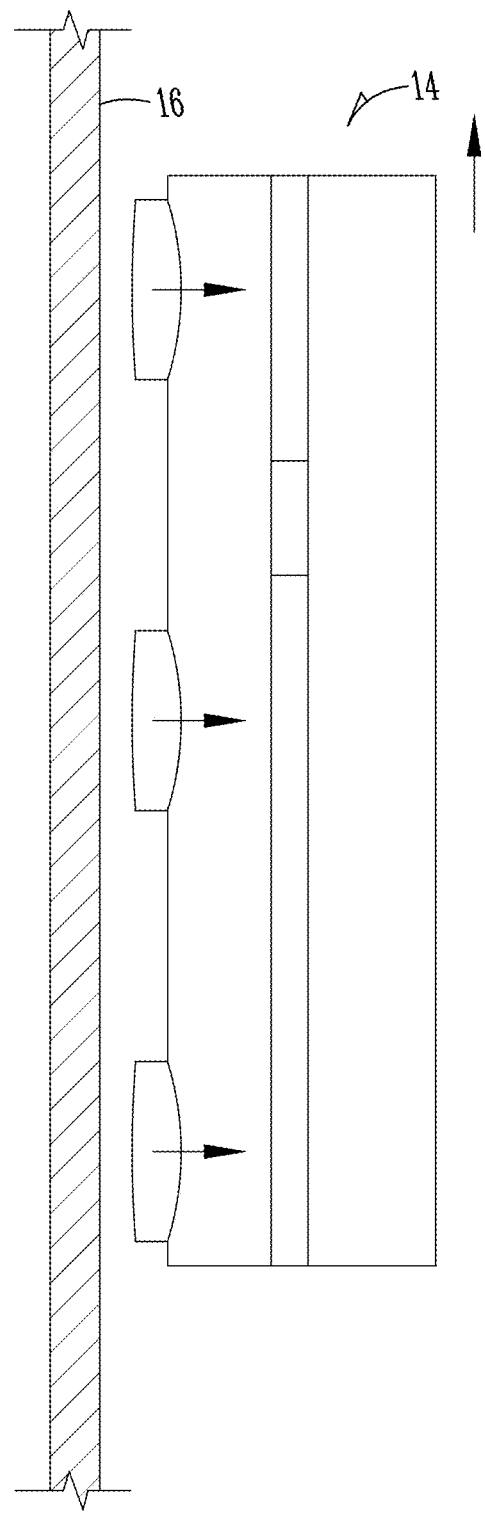
Figure 7A:
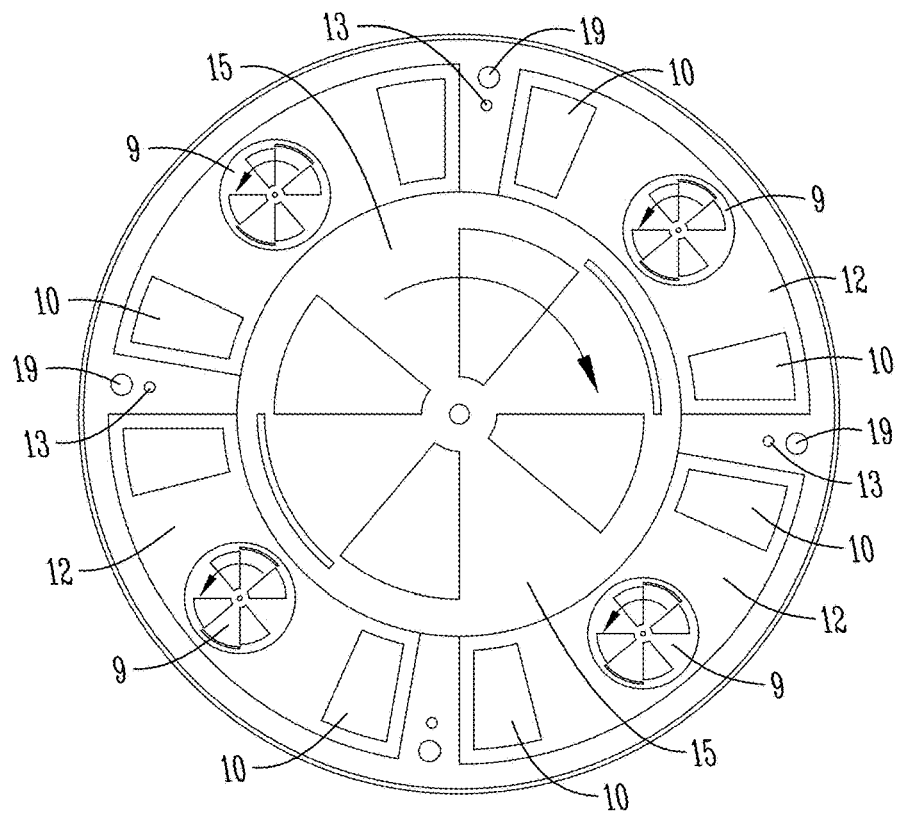
FIGS. 7A and 7B are sectional views taken along line 7-7 in FIG. 1, and showing a convertible piston valve in an open configuration and ballast valves in a closed configuration (FIG. 7A) and the convertible piston valve in a closed configuration with the ballast valves open (FIG. 7B).
Figure 7B:
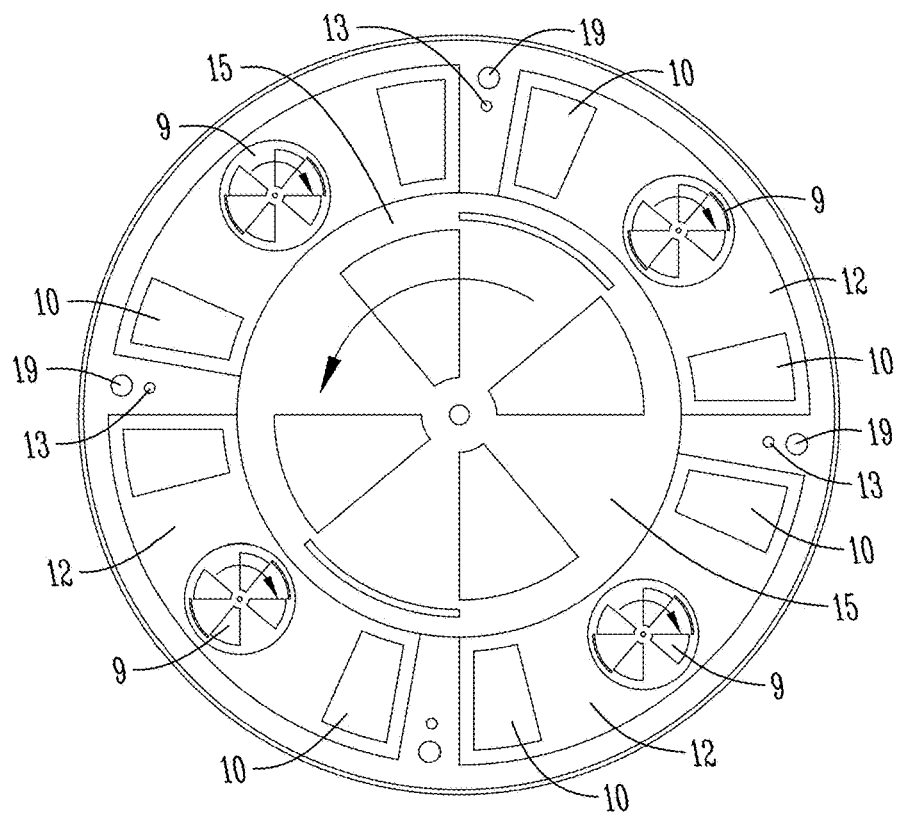

In addition, as shown in FIGS. 1, 6A, and 6B, the periphery of the convertible piston assembly g can include a single, continuous bladder 14, or a plurality of intermittent bladder assemblies 14. The one or more bladder assemblies 14 include an inflatable section, which may be an inflatable polymer. During the downward movement of the convertible piston assembly g, the bladder(s) 14 is inflated using an external compressor and compressed air tank unit lined up to it via the ballast tank air hose to press a portion of the bladder near or against the wall of the housing 102. This creates a seal between the bladder(s) and the wall of the housing, which may be water-tight to prevent or otherwise mitigate water from being displaced above the convertible piston through the internal sides of the housing 102 during the downward movement. During upward movement of the convertible piston, the bladder can be deflated to allow for easier or more efficient upward movement with less impedance on the convertible piston assembly g. FIG. 6A shows the inflated bladder or bladders 14, along with showing a downward arrow to indicate movement of the convertible piston assembly. Note that the arrows pointing towards the left side of the figure indicate an outward inflation of the bladders towards the wall 102. As shown in FIG. 6B, the bladders have been deflated, as indicated by the rightward facing arrows. Notice a gap between the bladders and the wall 102. In addition, the upward facing arrow indicates that the convertible piston is moving upward.

As noted, water is introduced into the housing 102 of the system 100. The convertible piston assembly g is moved upward towards a point marked by a convertible piston stopper 41. The inflatable bladders 14, which can comprise abrasion resistant polymer convertible piston seals are inflated to ensure slidable, water-tight contact between convertible piston sides and housing wall 16. The ballast tank rotary valves 9 open and water is allowed to enter into the ballast steel tanks 12, which displaces the air, which is vented through the ballast tank air hose 19. The level of water in the ballast steel tanks are equalized using the ballast steel tank equalization line 8. The equalization line 8, the calculated height of the set of convertible piston inflatable seals, and the uniform distribution of weights on the convertible piston mitigates or prevents the convertible piston from tilting to any direction while moving upward or downward. The convertible piston g has a central convertible piston door rotary valve 15. This valve is closed when the convertible piston dives downward and open when the convertible piston dives upward. The convertible steel convertible piston water channel 18 allows smooth passage of water across the convertible steel convertible piston base 22. The closed steel tanks containing calculated mass of weighted material 17 provides the desirable base weight of the convertible steel convertible piston alongside with the steel frames and other steel structures on the convertible steel convertible piston. Further weight is derived from water above the convertible piston in the housing as it is being recycled back into the cylinder. The convertible steel convertible piston lands at the cylinder floor using the convertible steel convertible piston landing pad 10.

Upward movement (return) of the convertible piston g is made possible using ballast tank submersible pumps 11. The pumps 11 could be powered by created or stored system similar to the one illustrated in the figures. The ballast tank submersible pumps 11 evacuate water to a certain level in the ballast tanks 12 and discharges into the upper part of the convertible steel convertible piston through the ballast water discharge line fitted with check valve 13. Nature abhors vacuum. Therefore, air above the water level in the cylinder moves into the ballast tank through the ballast tank flexible air hose 19, which can be floated above the water level in the housing (i.e., line 23). The convertible steel convertible piston door 15 is gradually opened, and the inflatable convertible piston seals 14 deflated slowly, which allows the convertible piston to break free and dive upward due to the up thrust created by air in the ballast steel tanks which is less dense than water. On approaching the maximum submerged level, the seals 14 are gradually inflated back, which act as breaks and the central convertible steel convertible piston door 15 also closes. The mechanical convertible piston stopper 14 further stops the movement of the cylinder g. The cycle continues for upward and downward dive of the convertible piston to be achieved, which will displace the water through the rest of the power system 100.

Additional aspects of the power system 100 include that the base portion h comprises a discharge line 20 which is externally affixed by line clamps 21, a motorable penstock valve/strainer 5, a steel base 6, a reinforced concrete deep piling base 7, a reinforced concrete wall with steel plate in the lining 16, a personal lift way 36, and water 43, which has a level 23.

Therefore, the up and down movement of the convertible piston g displaces the water 43 in the housing 102. The displacement of the water upon downward movement of the convertible piston pushes the water below the convertible piston. This water must be displaced somewhere, and as will be understood, will be driven through a network of power-generating devices to create power from the movement. As the cylinder continuously lowers and raises, the water will continue to be displaced through the system, creating a steady output of power.

Figure 9A:
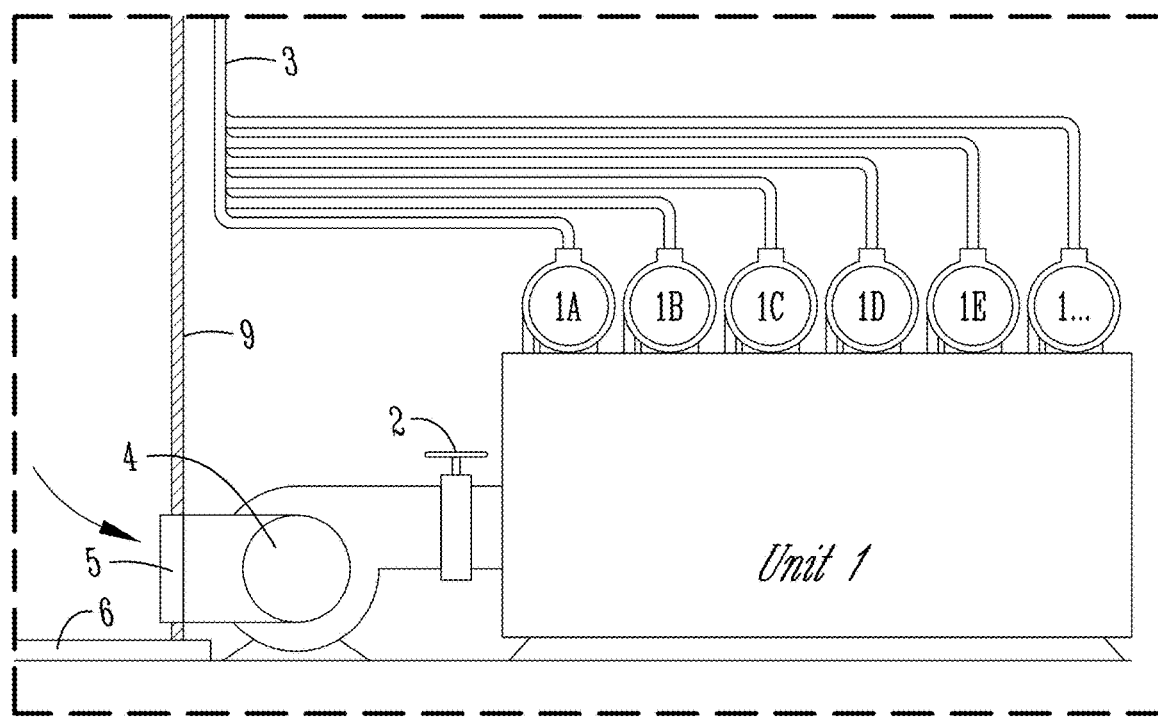
FIGS. 9A and 9B are similar and mirrored, enlarged views of portions of the system in 9-9 from FIG. 1.
Figure 9B:
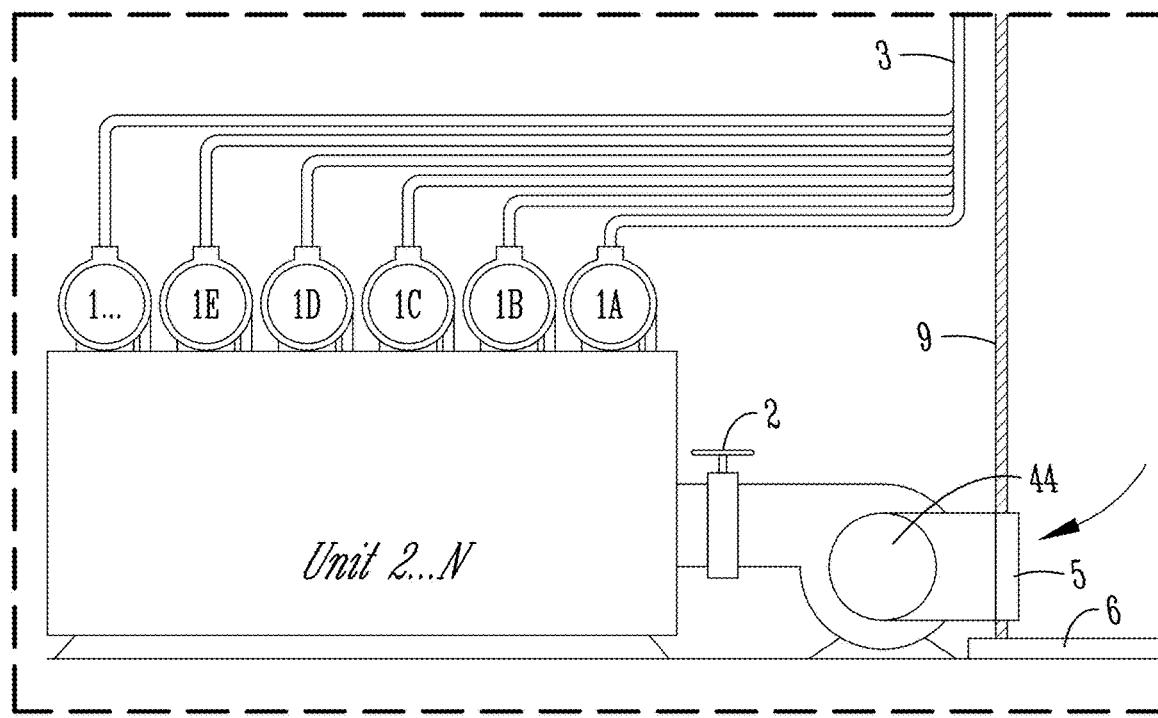

Next moving to FIGS. 1, 9A, and 9B, the power system 100 is commissioned when the motorable penstock valve and strainer 5 opens, allowing the displaced water being acted upon by the convertible piston g to enter a turbine generator unit 4 or 44, where the first stage of electricity is generated. It is noted that the turbine units 4 and 44 are positioned at different locations around the housing 102 to allow for greater capture of the displaced water. Note also that the position of the unit 4, 44 and 1 may be not always be at the bottom of housing 102 depending upon if housing 102 is built above ground or below ground. Where housing 102 is built as a vertical shaft below ground using vertical shaft sinking machine, the unit 4, 44 and 1 is located near but below water level 41 but the penstock remains at the bottom lined up to it. In addition, the turbines 4, 44 may be Francis turbines, which inward-flow reaction turbines that combine radial and axial flow concepts. The Francis turbine generator unit discharges into another turbine generator unit 1, which may be a Kaplan turbines generator unit in parallel manifold, where the second stage of electricity is generated. The Kaplan turbine is an inward flow reaction turbine, which means that the working fluid changes pressure as it moves through the turbine and gives up its energy. Power is recovered from both the hydrostatic head and from the kinetic energy of the flowing water. The design combines features of radial and axial turbines. The inlet is a scroll-shaped tube that wraps around the turbine's wicket gate. Water is directed tangentially through the wicket gate and spirals on to a propeller shaped runner, causing it to spin. The outlet is a specially shaped draft tube that helps decelerate the water and recover kinetic energy. The turbine does not need to be at the lowest point of water flow as long as the draft tube remains full of water. A higher turbine location, however, increases the suction that is imparted on the turbine blades by the draft tube. The resulting pressure drop may lead to cavitation. Variable geometry of the wicket gate and turbine blades allow efficient operation for a range of flow conditions. Kaplan turbine efficiencies are typically over 90%, but may be lower in very low head applications.

In this unit, a plurality of smaller turbines (in the embodiment shown, there are five listed as 1A, 1B, 1C, 1D, 1E, and 1 . . . , wherein the last allows any number to be used) are arranged in parallel with a common inlet and separate smaller discharge lines 3 and 20 heading towards the moment power wheel section u of the system 100.

Figure 3:
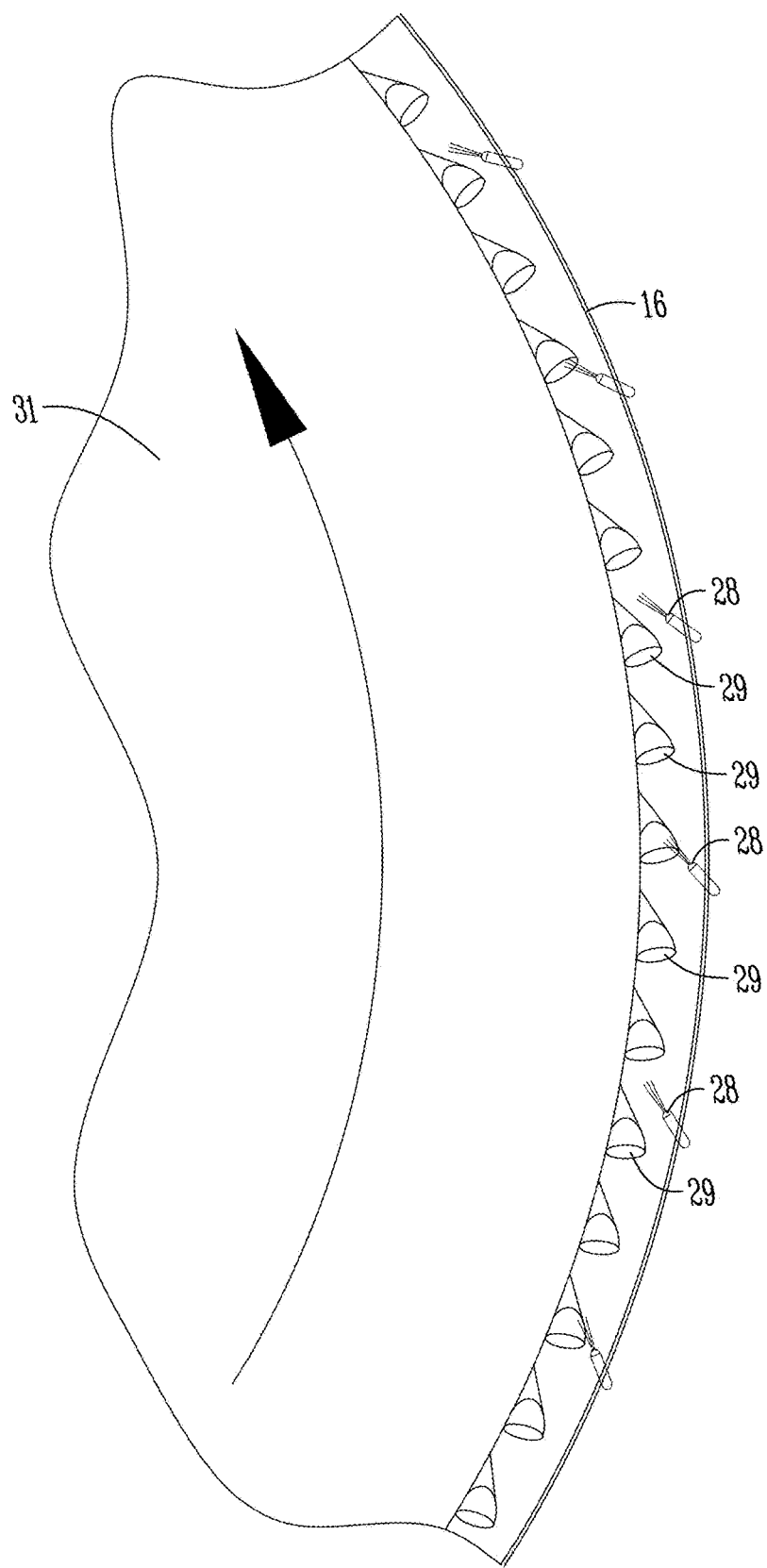
FIG. 3 is an enlarged view showing a portion of FIG. 2.
Figure 4:
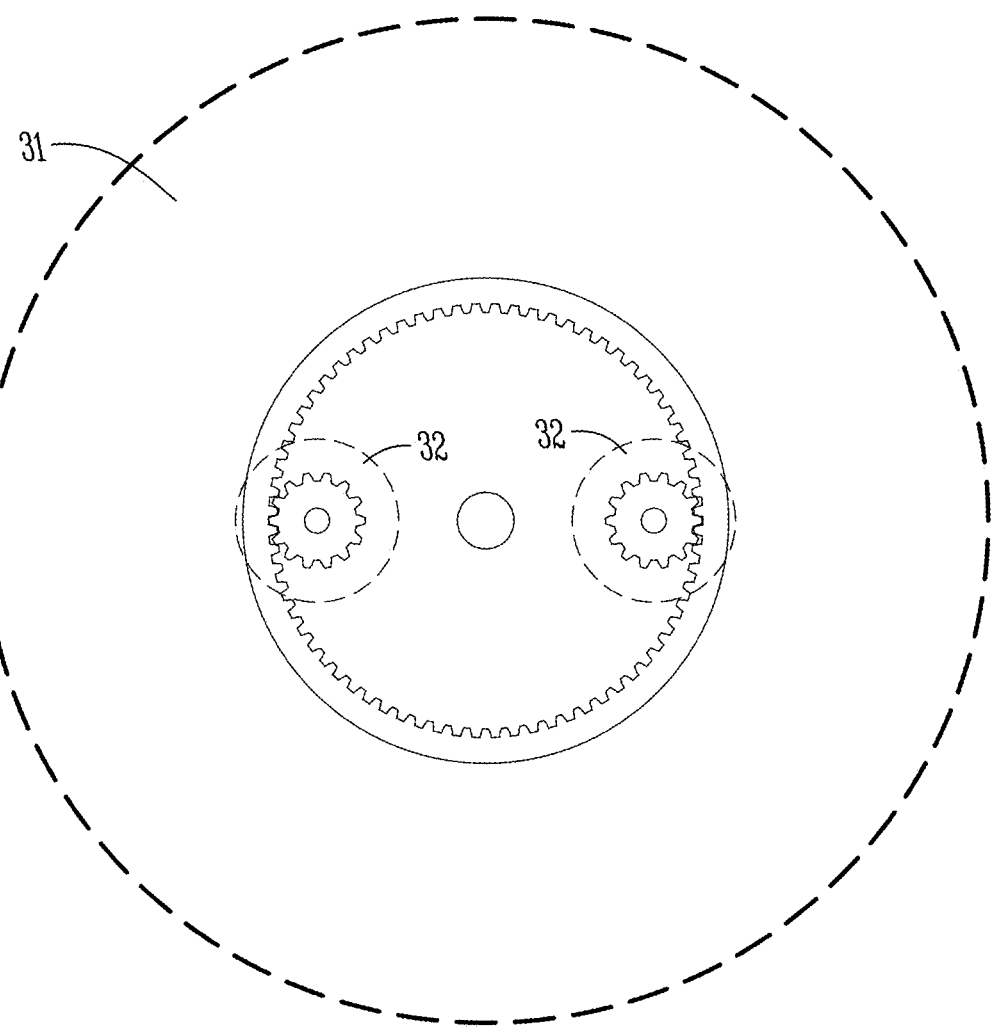
FIG. 4 is another enlarged view of a portion of FIG. 2.
Figure 5:
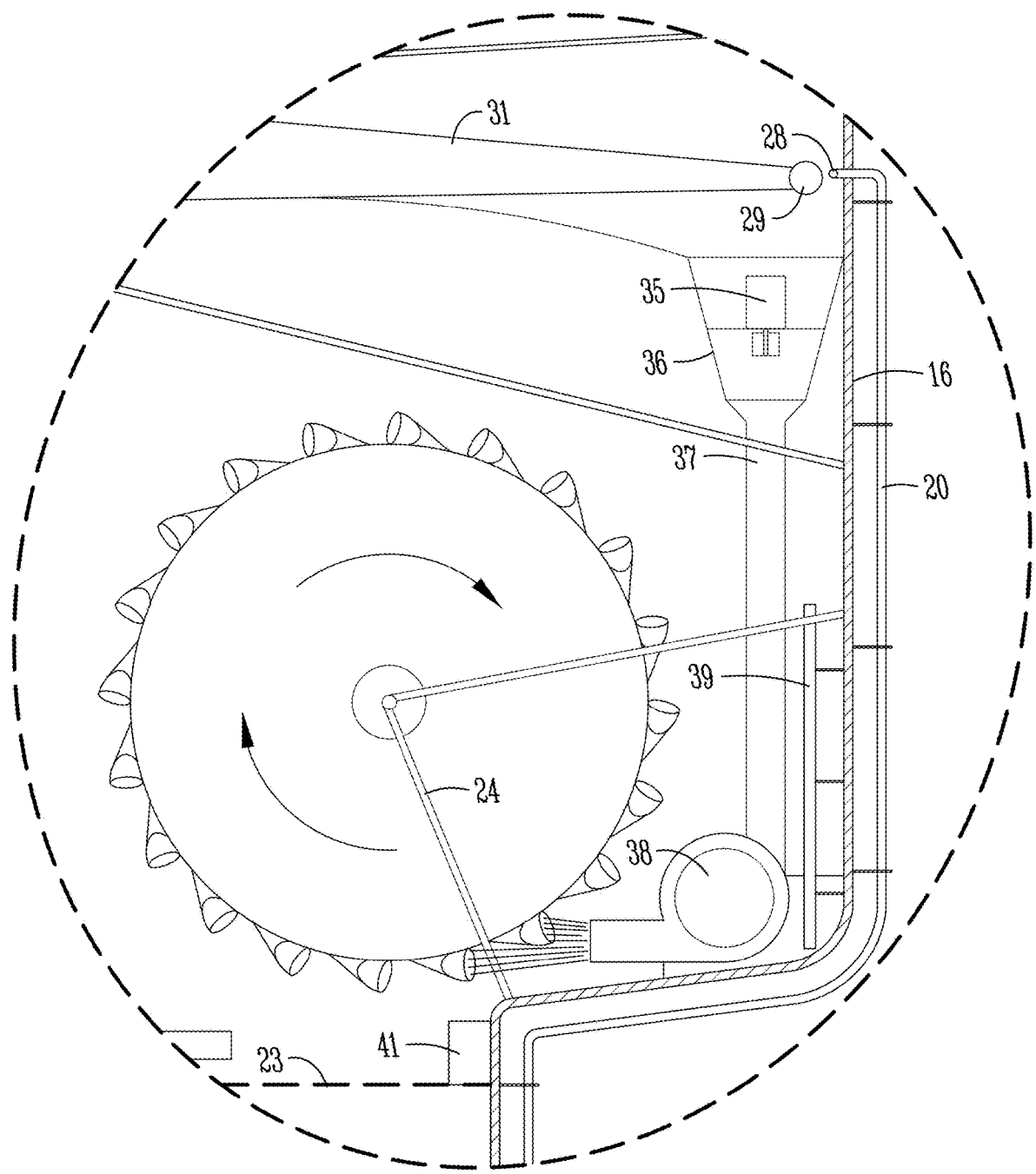
FIG. 5 is an enlarged view showing a portion of the system of FIG. 1.

The moment power wheel section u is shown best in FIGS. 1, 2, 3, 4, and 5. The lines 3, 20 are fastened to the cylindrical tower housing 102 using discharge lines clamps 21. The Kaplan turbine discharge line high pressure tapered head 28 is tangentially directed towards the moment power wheel disc-like steel structure 31 such that a high pressure stream of water discharges from the lines 3, 20 at the head 28 and impacts the moment power wheel generator impact fins 29 of the moment wheel structure 31, causing it to spin. According to some embodiments, the water impacts the fins tangentially and almost perpendicularly. The fins 29 can take many forms and are shown in the figures to be cup-like to efficiently receive the water to convert to rotation. This is best shown in FIG. 3. However, the exact configuration and/or number of fins 29 is not to be limiting to the invention. In addition, the size of the moment wheel 31 should also not be limiting.

The moment wheel 31 is a type of flywheel or Pelton wheel. A flywheel is a mechanical device specifically designed to efficiently store rotational energy (kinetic energy). Flywheels resist changes in rotational speed by their moment of inertia. The amount of energy stored in a flywheel is proportional to the square of its rotational speed and its mass. The way to change a flywheel's stored energy without changing its mass is by increasing or decreasing its rotational speed. Since flywheels act as mechanical energy storage devices, they are the kinetic-energy-storage analogue to electrical capacitors, for example, which are a type of accumulator. Like other types of accumulators, flywheels smooth the ripple in power output, providing surges of high power output as required, absorbing surges of high power input (system-generated power) as required, and in this way act as low-pass filters on the mechanical velocity (angular, or otherwise) of the system. However, the moment power wheel functions much more like a Pelton wheel than a fly wheel in converting impact force to rotational motion and also more like a lever as it is designed to leverage on very large radius to amplify the impact force at its circumferential fins, increase torque to do more useful work towards its center.

The moment power wheel steel support structure 25 provides a base for the moment power wheel shaft and bearing housing 27, which enables the moment power wheel to rotate, which can be at high speed, steadily and safely. The moment power wheel upper steel support structure 30 holds the end bearing housing of the moment power wheel and provides a stationary base for the moment power wheel alternators and gears 32 (see, e.g., FIG. 4). The technical merging of the alternator gear with the wheel gear rack (a large circular rack located close to the moment power wheel shaft) translates the rotation of the moment power wheel to the rotation of the alternator shaft to generate electricity at the third stage. It should be noted also that an alternator can be assembled with a speed increasing gearbox directly at the central shaft of the moment power wheel.

The housing roof 33 covers the upper section of the tower 102. There is also a lightning arrester 34 to protect the system 102 from the dangers and damaging effects of lightning strike. This could also be a simple lightning rod made of metal.

A vortex water trough 36 gathers the water after impacting the moment power wheel impact fins 29 and creates a head of 3-meters (this is for exemplary purposes only, and the exact head size should not be limiting on the invention), which drives a vortex power generator 35 for a fourth stage power generation. According to principles of gravitation water vortex power, the technology is based on a round basin with a central drain. Above the drain the water forms a stable line vortex which drives a water turbine. The water passes through a straight inlet and then passes tangentially into a round basin. The water forms a big vortex over the center bottom drain of the basin. A turbine withdraws rotational energy from the vortex, which is converted into electric energy by a generator.

The vortex trough discharge 37 then directs output water into a secondary Kaplan turbine generator 38 for a fifth stage power generation. This secondary Kaplan turbine generator 38 discharges water towards a secondary moment power wheel generator 40 for a sixth stage power generation. This is shown in greater detail in FIG. 5. As shown in the figure, the moment wheel 40 is supported by a frame 24. The wheel 40 includes a number of fins about the periphery of the wheel. The fins interact with the discharged water from the turbines 38 to rotate to generate additional power.

The water, after interacting with the moment wheels 40, falls back smoothly toward the lower portion h of the housing 102. The 1st, 2nd, and 3rd power generation stages are the primary power generators while the 4th, 5th, and 6th power generation stages are the secondary power generators.

Figure 10:
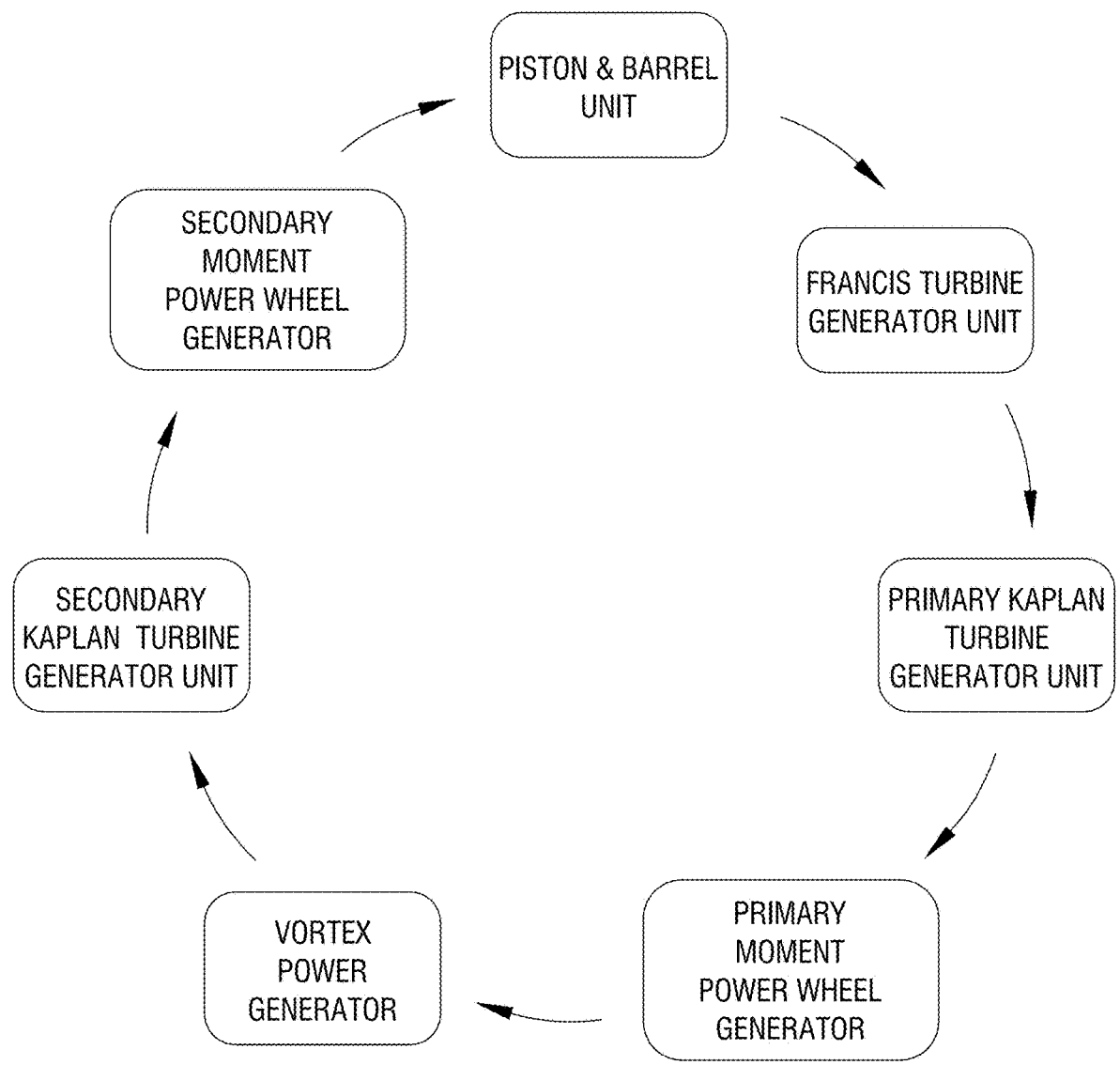
FIG. 10 is an exemplary flow chart showing a process of power generation according to any of the embodiments disclosed herein.
Figure 11:
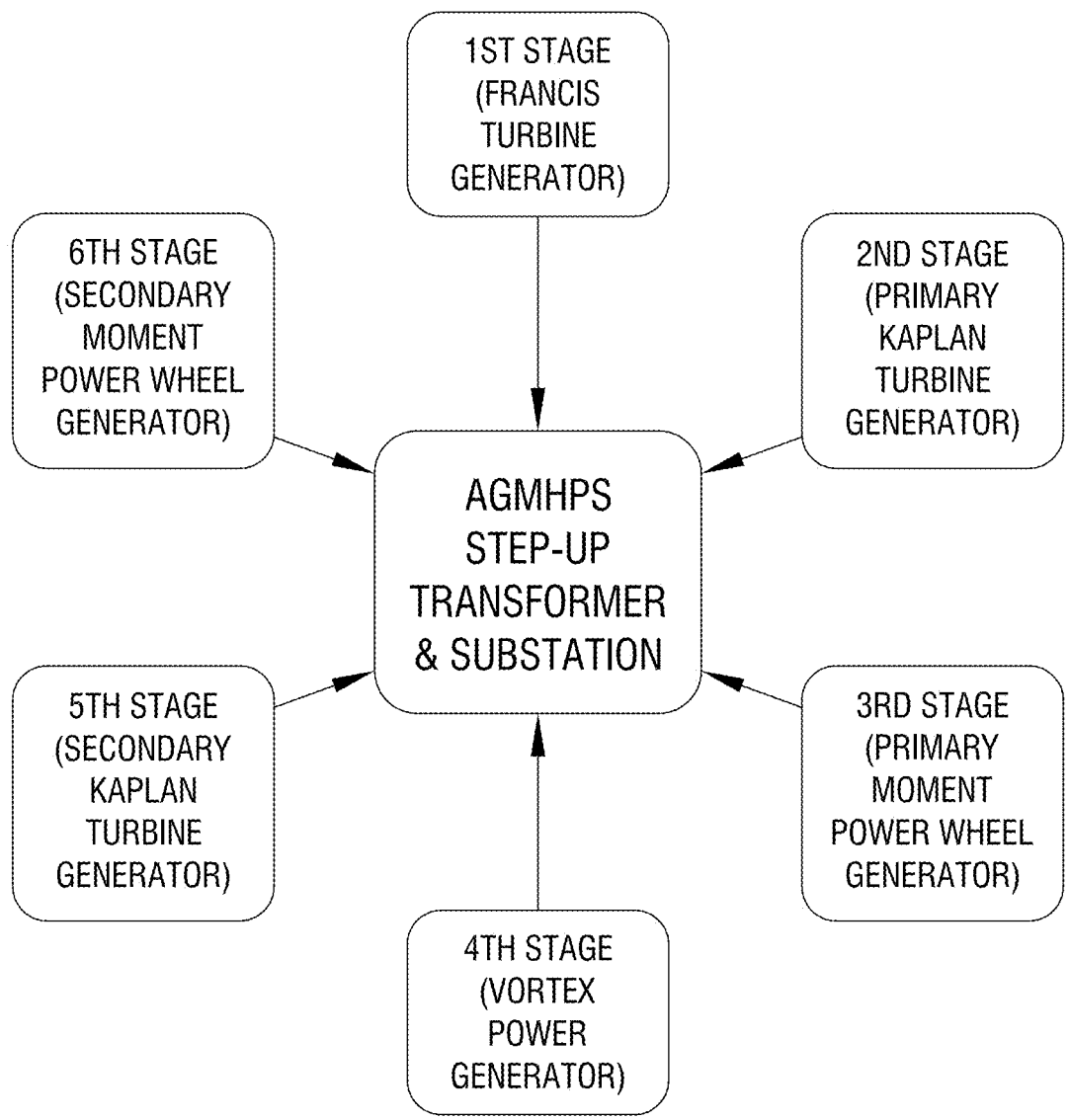
FIG. 11 is an exemplary hierarchy for generating and storing energy according to any of the embodiments disclosed herein.

FIGS. 10 and 11 illustrate the water cycle (FIG. 10) and power generation stages (FIG. 11), respectively. The power generated is conducted to power step up transformers and one or more substations for synchronization and supply to where electricity is needed. These processes are controlled by a programmable logic control (PLC) system.

The moment power wheel section u is made of steel plate cylindrical wall reinforced with steel support frames 24. This section u may have a wider diameter than the base section h and provides a floor space wider than 3-meters for maintenance and installations purposes. The convertible steel convertible piston maintenance hoisting hook 26 enables maintenance work such as change of damaged convertible piston seals and other maintenance works. A vertical ladder 39 can be provided for personnel access to the moment power wheel generators and structural platforms. A personnel lift 42 system is installed to convey personnel from a basement to section u floor. Where housing 102 is built completely underground as a vertical shaft using vertical shaft sinking machine, the personnel lift 42 will only be required to move personnel from basement where unit 4, 44 and 1 are installed to the top of the moment power wheel.

According to at least some embodiments, typical housing dimensions can be as follows: h section internal cylinder radius equal to about 5 to 50-meters and concrete wall thickness equal to, less than or greater than about 1-meter, h equal to, less than or above about 300-meters, g equal to, less than or above about 20-meters, u equal to, less than or above about 25-meters and the roof section equal to, less than or above about 10-meters.

Thus, the working principle in summary is that the weight of the convertible piston and water above the convertible piston exerts pressure on the water beneath the convertible piston-base in line with Pascal's Law, which states that "a change in pressure at any point in an enclosed fluid at rest is transmitted undiminished to all points in the fluid". This pressure drives water to flow from the interior of the housing through a conduit that is in-line with at least one or more of a Francis turbine generator, one or more of a Kaplan turbine generator, one or more of a moment power wheel generator, one or more of a vortex power generator, one or more of a secondary Kaplan turbine generators, and one or more of a secondary moment power wheel generator, where electricity is generated in six stages respectively. The water is then recycled into the housing. The convertible piston moves downward by gravity and upward by up thrust created by air liquid displacement by a pump. This is governed by Archimedes' Principle, which states that "a body immersed in a fluid experiences a buoyant force equal to the weight of the fluid it displaces". Air in the ballast tanks is less dense than water, therefor it creates an up thrust that lifts the convertible steel convertible piston upward. The moment power wheel leverages on its large diameter to convert impact force on its fins to do more mechanical rotational work, which in turn is converted into electrical energy by alternators. This is in line with Archimedes Operating Principles of a Lever which states that "the moment of a force about a point or object is equal to the product of the applied force and the perpendicular distance of the applied force to point or object". It also obeys Newton's Laws for Rotation: Newton's First Law for Rotation states that an object at rest tends to remain at rest, and an object at that is spinning tends to spin with an angular velocity, unless it is acted on by nonzero net torque or there is a change in the way the object's mass is distributed. Newton's Second Law for Rotation states that the net external torque is equal to moment of inertia multiplied by the angular acceleration.

According to some embodiments, two tower systems such as that shown in FIG. 1 are used for uninterrupted power generation. One tower generates power that is supplied to consumers and used to regenerate the second tower and vice versa. The cycle continues uninterruptedly for 24 hrs by 7 days by 365 day. Note that this does not implies that it is a perpetual motion machine in the concept of perpetual motion Advantages of such a system as shown and/or disclosed herein include, but are not limited to, the following, wherein the system:

Can be operated as an independent power generating system, i.e., does not need any external energy, be it grid energy to regenerate such as wind or solar after initial take off.

Provides continuous steady power, not intermittent—available at any time.

Is needless of expensive power storage because power is generated as demanded.

Provides power quality suitable for all kinds of loads and can withstand load surges.

Is flexible—if grid needs more power—motorable valves opens more to increase the water flow.

Provides the greenest source of dependable electricity. It uses gravitational force only, thus ensuring zero fuel use, zero emission and least environmental impact.

When compared with all other commercial sources of power generation, has the smallest environmental footprint per kilowatt of electricity generated, therefore, saving land for agriculture, human habitation and industrialization.

Is suitable for decentralized power generation, thereby ensuring less energy loss due to long distance transmission, which makes it possible to meet power requirements per city.

Provides the cheapest source of dependable electricity per kilowatt-hour given low operational cost, while maximize profits because less is lost in transmission and storage.

Should have easy permitting and licensing to build without a lot of environmental issues.

Has no need for elevation difference and availability of running river for siting of plant.

Includes automated Programmable Logic Controlled (PLC) six-stage optimum power generation ensures highest possible efficiency compared with any other energy system.

Utilizes flexible siting, lower capital cost, fast construction and commissioning, optimum water circulation, and early return on investment.

According to some embodiments, which may be incorporated into any of those shown and/or described herein, the housing of the system is shaped similar a typical grain bin. However, as shown, the housing 102 may take other shapes and sizes, such as a cylindrical base section with a bulbous upper portion (see, e.g., FIG. 1). In addition, it is noted that the housing is generally vertically oriented, and may also be referred to as a tower or like structure. Still further, it should be appreciated that the one or more towers as disclosed herein can be above or below ground.

Figure 12:
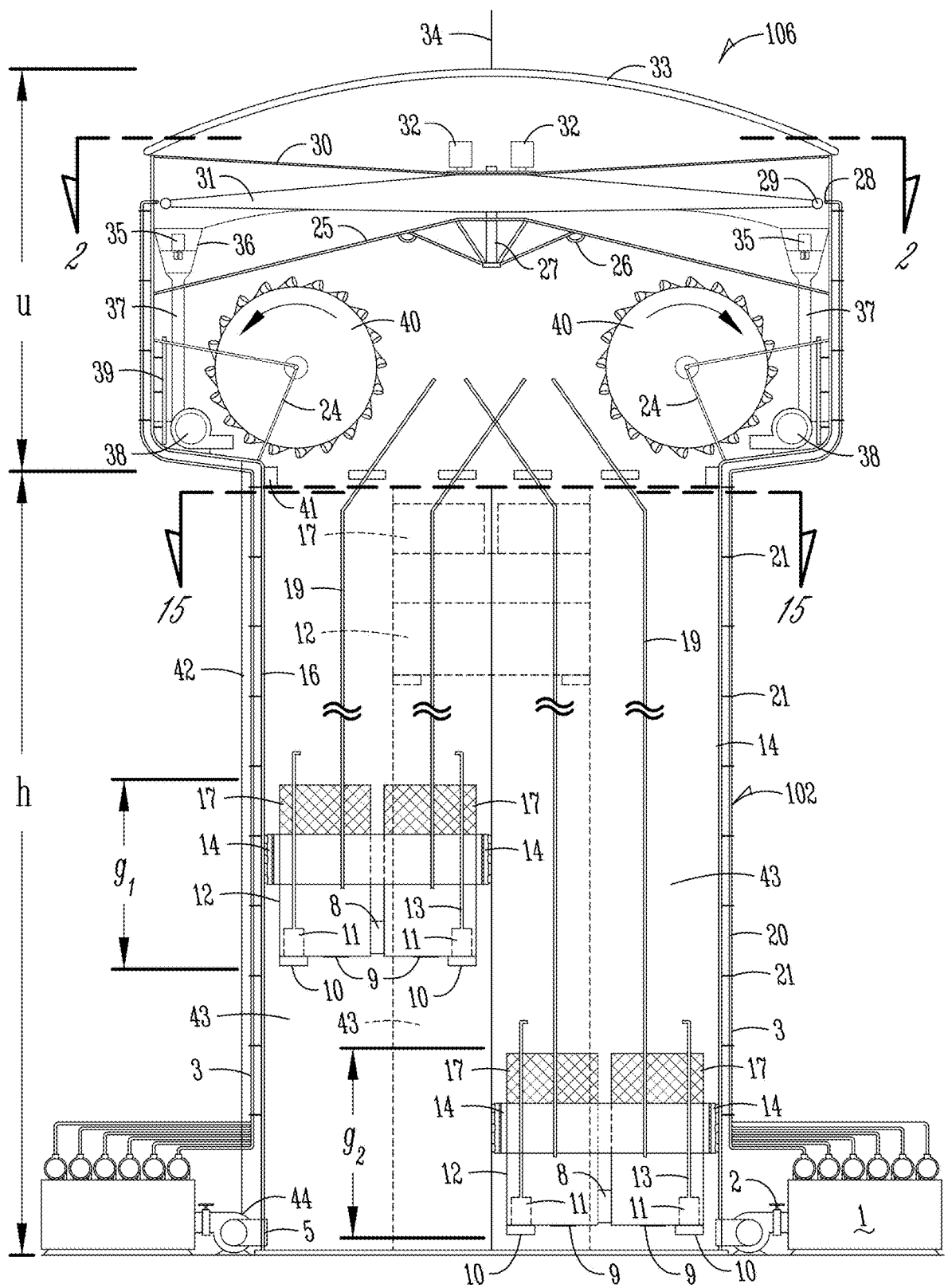
FIG. 12 is another sectional view of a power generating system according to aspects of the invention.
Figure 13:
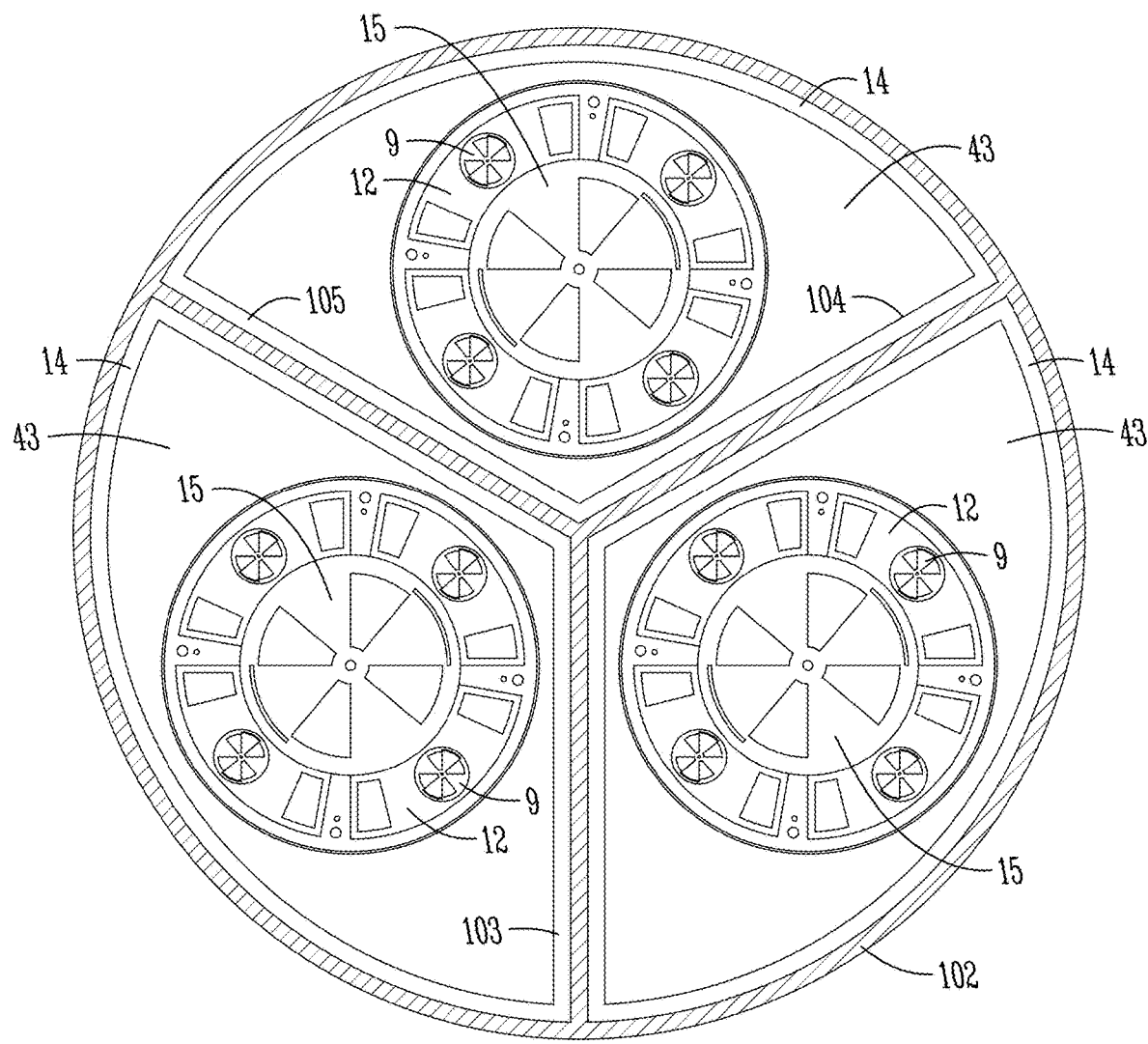
FIG. 13 is a sectional view of FIG. 12 as taken along line 15-15 in FIG. 12

Still additional embodiments include additional aspects of the invention. For example, FIGS. 12 and 13 illustrate such a situation. In these figures, many of the same structures and/or components are included as with respect to FIGS. 1-11. Therefore, these individual components will not be re-described. However, FIGS. 12 and 13 disclose a situation in which two or more housing 102 and convertible piston assemblies can share with a moment power wheel of a power system 100.

As noted herein, two or more housings could be used in conjunction with another to provide any external power to one another, as well as to increase the output of the combined tower units for a particular system. For the configurations shown in FIGS. 12 and 13 (where only one tower assembly is shown, but would be doubled with like components), the number of convertible piston and housing combinations could be greatly increased.

As shown in FIG. 13, the housing 102 could be three in number or more. These three separate housing 102 operate separately but interdependently for regeneration. However, the three housing 102 would be associated with a common power generation system 100 which comprises of a primary moment power wheel, vortex power generator, secondary Kaplan generator and secondary moment power wheel such as shown in FIG. 12, where the water displaced from any one of the sections would be moved through the first, second, third, fourth, fifth, and sixth power generation stages (see, e.g., FIGS. 10 and 11).

While a single convertible piston unit would allow for a single cycle of the power generation stages per downward movement, a situation with more than one convertible piston would allow for a staggering of the movement of the convertible pistons. This could provide for a near-continuous flow of water through the power stages to continuously produce power. This could be useful in higher-demand areas, or when a greater amount of power is to be generated for storage. The programming of the system could control the movement of the convertible pistons in order to provide for a most-efficient staggering of the plurality of convertible pistons in the separate housing 102 to attempt to provide the near-continuous flow of water through the power generation stages and consequent continuous power generation.

This can be further enhanced by the use of dual power systems 100 each have three separate housing 102 with convertible pistons moving separately. Each tower system would have a single, main moment wheel at the third stage of power generation, but would otherwise include separate other power stages for each of the individual housing 102 and convertible piston sections, which exponentially grows the potential power output generation.

As noted, any of the systems provided may be controlled mechanically, but it is contemplated that the system is to be controlled by a programmable logic control (PLC). The system may also utilize any industrial control system (ICS). ICS is a general term that encompasses several types of control systems and associated instrumentation used for industrial process control. Such systems can range from a few modular panel-mounted controllers to large interconnected and interactive distributed control systems with many thousands of field connections. All systems receive data received from remote sensors measuring process variables (PVs), compare these with desired set points (SPs) and derive command functions which are used to control a process through the final control elements (FCEs), such as control valves. The larger systems are usually implemented by Supervisory Control and Data Acquisition (SCADA) systems, or distributed control systems (DCS), though SCADA and PLC systems are scalable down to small systems with few control loops. Such systems are extensively used in industries such as chemical processing, pulp and paper manufacture, power generation, oil and gas processing and telecommunications.

One or more embodiments including the PLC described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

The PLC according to the aspects of the present disclosure may also include components such as an intelligent control and communication components. Examples of such intelligent control units may be central processing units alone or in tablets, telephones, handheld devices, laptops, user displays, or generally any other computing device capable of allowing input, providing options, and showing output of electronic functions. A central processing unit (CPU), also called a central processor or main processor, is the electronic circuitry within a computer that carries out the instructions of a computer program by performing the basic arithmetic, logic, controlling, and input/output (I/O) operations specified by the instructions. Still further examples include a microprocessor, a microcontroller, or another suitable programmable device and a memory. The controller also can include other components and can be implemented partially or entirely on a semiconductor (e.g., a field-programmable gate array ("FPGA")) chip, such as a chip developed through a register transfer level ("RTL") design process.

The memory includes, in some embodiments, a program storage area and a data storage area. The program storage area and the data storage area can include combinations of different types of memory, such as read-only memory ("ROM", an example of non-volatile memory, meaning it does not lose data when it is not connected to a power source) or random access memory ("RAM", an example of volatile memory, meaning it will lose its data when not connected to a power source). Some additional examples of volatile memory include static RAM ("SRAM"), dynamic RAM ("DRAM"), synchronous DRAM ("SDRAM"), etc. Additional examples of non-volatile memory include electrically erasable programmable read only memory ("EEPROM"), flash memory, a hard disk, an SD card, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

In order to interact or otherwise control any of the components of the system, a machine-user interface may be included. A user interface is how the user interacts with a machine. The user interface can be a digital interface, a command-line interface, a graphical user interface ("GUI") or any other way a user can interact with a machine. For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, etc. Input(s) received from the UI can then be sent to a microcontroller to control operational aspects of a device.

The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

As would be apparent to one of ordinary skill in the art, mechanical, procedural, or other changes may be made without departing from the spirit and scope of the invention. The scope of the invention is defined only by the appended claims, along with the full scope of equivalents to which such claims are entitled.

The present disclosure is not to be limited to the particular embodiments described herein. The following claims set forth a number of the embodiments of the present disclosure with greater particularity.

The invention claimed is:

1. A power generating system, comprising:
a housing containing water;
a convertible piston positioned in the housing, wherein the convertible piston is movable in the water contained in the water housing to displace an amount of the water, said convertible piston comprising at least one ballast, a weighted portion, and an inflatable bladder;
wherein the convertible piston is movable, in part, by gravity and by buoyancy;
a first power generation stage to receive an amount of displaced water displaced by the convertible piston to create a first amount electrical power;
a second power generation stage in fluid communication with the first power generation stage, wherein the second power generation stage receives water outputted by the first power generation stage to create a second amount of electrical power; and
a third power generation stage in fluid communication with the first and second power generation stages, wherein the third power generation stage receives water outputted by the first and second power generation stages to create a third amount of electrical power.

2. The system of claim 1, wherein the first power generation stage comprises a Francis turbine.

3. The system of claim 1, wherein the second power generation stage comprises a Kaplan turbine pump.

4. The system of claim 1, wherein the third power generation stage comprises at least one moment power wheel generator.

5. The system of claim 1, wherein the at least one ballast of the convertible piston includes a selectively controllable valve to selectively allow water to enter or be pumped out of an interior of the ballast.

6. The system of claim 5, wherein the at least one ballast further comprises an air vent in communication with the atmosphere to add buoyancy to the convertible piston.

7. The system of claim 1, wherein the inflatable bladder is inflated to control the downward movement of the convertible piston in the housing due to gravity.

8. The system of claim 1, further comprising:
a fourth power generation stage that receives water from the third power generation stage and before the water is re-introduced to the convertible piston;
wherein the fourth power generation stage comprises a vortex power generator.

9. The system of claim 8, further comprising:
a fifth power generation stage that receives water from the fourth power generation stage and before the water is re-introduced to the convertible piston;
wherein the fifth power generation stage comprises another Kaplan turbine generator.

10. The system of claim 9, further comprising:
a sixth power generation stage that receives water from the fifth power generation stage and before the water is re-introduced to the convertible piston;
wherein the sixth power generation stage comprises a second moment power wheel generator.

11. A method of power generation, the method comprising:
moving a convertible piston in a vertical direction in a housing to displace water disposed in the housing, the convertible piston moving downward by gravity and upward by buoyancy, wherein said convertible piston comprises at least one ballast, a weighted portion, and an inflatable bladder;
generating power at a first stage with the displaced water;
outputting the water from the first stage to a second stage to generate additional power at the second stage;
outputting the water from the second stage to a third stage to generate additional power at the third stage; and
outputting the water from the third stage back towards the convertible piston in the housing.

12. The method of claim 11, further comprising: before outputting the water towards the convertible piston, passing the water through a fourth, fifth, and sixth stage to generate additional power at each of the fourth, fifth, and sixth stages.

13. The method of claim 12, wherein:
the first stage comprises a Francis turbine generator;
the second and fifth stages comprise Kaplan turbine generators;
the third and sixth stages comprise moment power wheel generators; and
the fourth stage comprises a vortex power generator arranged as shown herein.

14. The method of claim 11, wherein the step of moving the convertible piston downward by gravity comprises opening at least one entry to the at least one ballast of the convertible piston to allow water to enter the at least one ballast to increase the weight of the convertible piston.

15. The method of claim 14, wherein the step of moving the convertible piston upward by buoyancy comprises pumping out the water in the at least one ballast and replacing the water with air to increase the buoyance of the convertible piston.

16. A gravity-based, moment hydro-power system, comprising:
a vertical housing containing water;
a convertible piston in the housing, the convertible piston movable in a generally vertical direction, said convertible piston comprising at least one ballast, a weighted portion, and an inflatable bladder;
a power generation series in fluid communication with the housing, the power generation series comprising:
a first stage power generator;
a second stage power generator; and
a third stage power generator;
wherein each of the power generators of the power generation series in fluid communication with one another; and
wherein the convertible piston moves downward, in part by gravity, to displace the water in the housing, the displaced water moving through the power generation cycle before returning towards the convertible piston.

17. The system of claim 16, wherein the power generation series further comprises:
a fourth stage power generator;
a fifth stage power generator; and
a sixth stage power generator.

18. The system of claim 17, wherein:
the first stage comprises a Francis turbine generator;
the second and fifth stages comprise Kaplan turbine generators;
the third and sixth stages comprise moment power wheel generators; and
the fourth stage comprises a vortex power generator.

19. The system of claim 16, wherein the convertible piston moves downward by gravity by opening at least one entry to the at least one ballast of the convertible piston to allow water to enter the at least one ballast to increase the weight of the convertible piston while the convertible piston central door is closed and the bladder inflated thereby exerting pressure on water below the convertible piston.

* * * * *